(12) United States Patent
Leader et al.

(10) Patent No.: US 10,945,559 B2
(45) Date of Patent: Mar. 16, 2021

(54) AUTOMATIC FRYER

(71) Applicant: Henny Penny Corporation, Eaton, OH (US)

(72) Inventors: Charles Leader, Napoleon, OH (US); Chuck Tomecek, Edgerton, OH (US); John Hill, Bryan, OH (US); Dave Casler, Defiance, OH (US); Michael Manzella, Toledo, OH (US); Rick Baden, Napoleon, OH (US); William M. Casey, Kettering, OH (US); Melissa M. Hohler, Kettering, OH (US); Edward J. Florkey, Vandalia, OH (US); Manouchehr Shirali, Richmond, IN (US); Douglas A. Burkett, Eaton, OH (US); Mark Gogel, Richmond, IN (US); Brian K. Brooks, Wilmington, OH (US)

(73) Assignee: Henny Penny Corporation, Eaton, OH (US)

( * ) Notice: Subject to any disclaimer, the term of this patent is extended or adjusted under 35 U.S.C. 154(b) by 308 days.

(21) Appl. No.: 15/772,830

(22) PCT Filed: Nov. 6, 2015

(86) PCT No.: PCT/US2015/059549
§ 371 (c)(1),
(2) Date: May 2, 2018

(87) PCT Pub. No.: WO2017/078739
PCT Pub. Date: May 11, 2017

(65) Prior Publication Data
US 2018/0325317 A1    Nov. 15, 2018

(51) Int. Cl.
*A47J 37/12*    (2006.01)

(52) U.S. Cl.
CPC ....... *A47J 37/1219* (2013.01); *A47J 37/1214* (2013.01); *A47J 37/1228* (2013.01); *A47J 37/1266* (2013.01); *A47J 37/1276* (2013.01)

(58) Field of Classification Search
CPC ............... A47J 37/1219; A47J 37/1214; A47J 37/1228; A47J 37/1266; A47J 37/1276
See application file for complete search history.

(56) References Cited

U.S. PATENT DOCUMENTS

| | | | | |
|---|---|---|---|---|
| 4,250,959 A | * | 2/1981 | Spasojevic | A47J 27/04 165/61 |
| 4,658,709 A | * | 4/1987 | Anderson | A47J 37/1214 426/438 |

(Continued)

FOREIGN PATENT DOCUMENTS

| | | |
|---|---|---|
| JP | S6244213 A | 2/1987 |
| JP | 201022371 A | 2/2010 |
| WO | 2008105857 A1 | 9/2008 |

OTHER PUBLICATIONS

International Searching Authority, Search Report and Written Opinion issued in International Application No. PCT/US2015/059549 dated Jul. 28, 2016 (12 pages).

(Continued)

*Primary Examiner* — Bayan Salone
(74) *Attorney, Agent, or Firm* — Wood Herron & Evans LLP

(57) ABSTRACT

An automatic fryer apparatus and method of frying food products includes a cooking chamber, a heating mechanism disposed in the cooking chamber, and a pump disposed at an end of the cooking chamber to circulate cooking medium within the cooking chamber. Food product is added to the cooking chamber and flows along with the cooking medium in a flow direction. A controller controls a plurality of gates by individually actuating each gate. The controller stores (Continued)

data regarding predetermined time periods, which regulate when to raise and lower each gate. Food product moves downstream of each gate along a flow direction when each respective gate is raised. Food product is automatically transferred to a holding station when it reaches an outlet end of the cooking chamber.

9 Claims, 8 Drawing Sheets

(56) References Cited

U.S. PATENT DOCUMENTS

| | | | | |
|---|---|---|---|---|
| 8,372,467 B2* | 2/2013 | Caridis | ............... | A47J 37/1214 |
| | | | | 426/637 |
| 2005/0153022 A1* | 7/2005 | Schilling | ............. | A47J 37/1233 |
| | | | | 426/92 |
| 2010/0021602 A1* | 1/2010 | Caridis | ................... | A23L 19/18 |
| | | | | 426/438 |
| 2014/0004234 A1* | 1/2014 | Mosteller | ................ | A47J 37/12 |
| | | | | 426/231 |

OTHER PUBLICATIONS

European Patent Office, Extended European Search Report issued in EP Application No. 15907977.1-1006 dated May 8, 2019 (5 pages).
Japanese Patent Office, Office Action issued in JP Application No. 2018-522964 dated Jun. 18, 2020 with English Translation (12 pages).

* cited by examiner

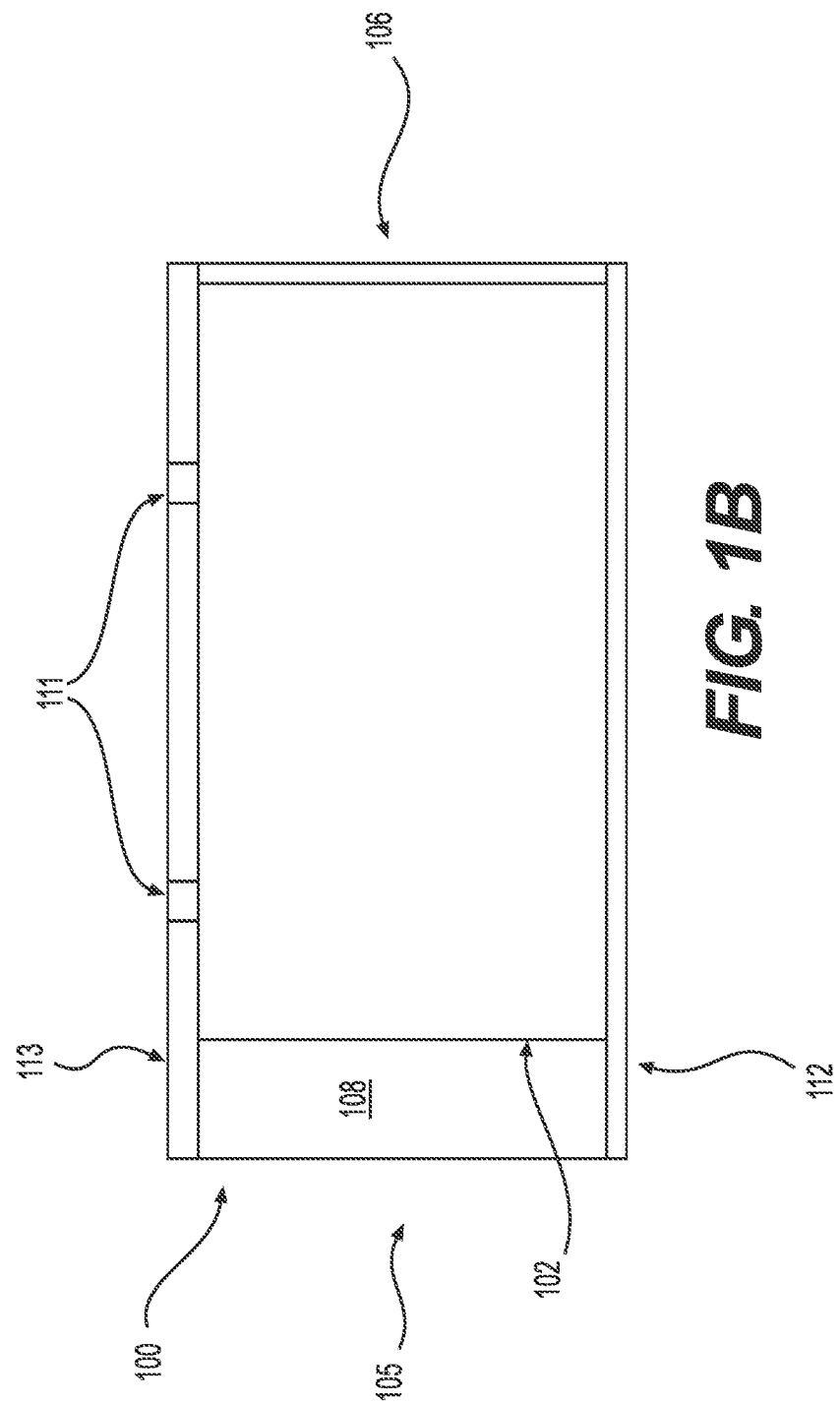

AUTOMATIC FRYER

CROSS-REFERENCE TO RELATED APPLICATION

This application is a national phase application of, and claims priority to, International Patent Application PCT/US2015/059549, filed on Nov. 6, 2015, which is incorporated by reference herein in its entirety.

BACKGROUND OF THE INVENTION

Technical Field

The present invention relates generally to systems and methods for automatically heating and cooking food products using cooking medium in a cooking apparatus, such as a fryer.

2. Description of Related Art

Known fryers, e.g., open-well fryers and pressure fryers, are used to cook various food products, e.g., poultry, fish, or potato products. Such fryers include a cooking vessel, e.g., a frypot, and the cooking vessel is filled with a cooking medium, e.g., an oil, a liquid shortening, or a meltable-solid shortening. Such fryers also include a heating element, e.g., an electrical heating element, such as a heating coil, or a gas heating element, such as a gas burner and gas conveying tubes, which heat the cooking medium in the cooking vessel. After the cooking medium reaches a preset cooking temperature, the food product is placed into the cooking medium, such that the food product is cooked in the cooking medium. For example, the food product may be positioned inside a product holder, e.g., a wire basket, and submerged in the cooking medium for a predetermined amount of time sufficient to cook or to heat the food product. The amount of time sufficient to cook or to complete the cooking of the food product at a given cooking temperature depends on the type of food product which is cooked. Moreover, the cooking medium is used during several cooking cycles before the cooking medium inside the cooking vessel is filtered, replaced, or supplemented with a new or filtered supply of cooking medium.

Known fryers typically include a fryer vat containing cooking oil, which is heated by a heating source. The vat is designed to receive a basket containing the food products, which are immersed in the oil and cooked. After being cooked, the basket is removed and drained of excess oil. The vat can be adapted to receive one or more baskets containing uncooked food products, which results in a large amount of frozen food products being placed into the hot oil at the same time. This decreases the oil temperature and increases the overall cooking time. Baskets in known fryers can also slide on a rail for loading and unloading of food products or can be automatically raised and lowered out of the oil. This type of movable basket requires complicated control mechanisms to track the basket locations. Augers are also used in known fryers to move food products horizontally from submersion in oil, up and out to a dumping station. Augers are limited by slow operational speed and a resulting mess created by oil at the output side of the fryer. Conveyor belts and paddles are also commonly used in fryers to ensure even cooking and flow of the food products through the oil within a frying chamber, but these require multiple moving parts and can result in rough handling of the food products.

The cooking medium may be filtered periodically to maintain cooking quality and to prolong the operational lifetime of the cooking medium. The filtering process removes cooking by-product, e.g., suspended food particles, ranging from dust-sized particles to larger pieces of crackling and small pieces of food product. Known contemporary filtering systems require the operator to manipulate manual valves to route the cooking medium through the filter and to return it to a cooking vessel, e.g., a frypot, disposed within the fryer. Even experienced operators may open or close the valves incorrectly, which increases operating expenses through lost time. Periodically, the drain pan under the fryer may be removed for cleaning or to discard the cooking medium. If the operator forgets to replace the drain pan and opens the drain valve, the cooking medium drains onto the floor and is wasted, which greatly increases operating expenses.

Therefore, a need has arisen for improved devices and methods for automatically cooking food products and continually filtering the cooking medium in a fryer that overcome these and other shortcomings of the related art. Specifically, the invention relates to the use of continuously flowing cooking medium that is circulated through a flume style cooking chamber, and also is filtered as the cooking medium circulates through the system. A technical advantage is improved temperature uniformity of the cooking medium for all food products because the cooking medium is being continuously circulated. This uniformity may allow for better product consistency. In addition, the continuously flowing cooking medium eliminates the need for baskets to transport the food products and leads to greater throughput of food products.

Another technical advantage is that the continuous filtration eliminates operational interruptions because the oil can be filtered while cooking and extends the oil life. A further technical advantage is that the flume style cooking chamber may have a false bottom design, which makes it easier to clean, in turn reducing the amount of downtime needed.

SUMMARY OF THE INVENTION

According to an exemplary embodiment, a system for automatically frying food products is provided which includes a cooking chamber that is configured to receive cooking medium and food product. A heating mechanism is disposed in the cooking chamber and is configured to heat the cooking medium. A pump is disposed at a first end of the cooking chamber to continuously circulate the cooking medium through the system, in a flow direction along the length of the flume style cooking chamber from a first end to a second end. A ledge is connected to the first end of the cooking chamber, and extends towards a second end opposite the first end, and a false bottom is configured to rest on the ledge. The system also contains a first gate and a second gate spaced along the length of the cooking chamber and configured to be separately and individually actuated. The gates are actuatable from a first position, where each gate is proximate to, or even in contact with, the false bottom, to a second position, which enables food products to move downstream of each gate along the flow direction while each gate is in the second position.

According to another exemplary embodiment, a method for automatically frying food products includes circulating cooking medium through a fryer apparatus in a flow direction using a pump and delivering food products to an inlet end of the fryer apparatus. The method includes actuating a first gate from a first lowered position to a first raised position after a first predetermined amount of time, and the food product moves downstream of the first gate along a flow direction in response to the circulation of cooking medium while the first gate is in the first raised position. The method also includes returning the first gate from the first raised position to the first lowered position after a second predetermined amount of time. The method includes actuating a second gate from a second lowered position to a second raised position after a third predetermined amount of time, and food product moves downstream of the second gate along the flow direction in response to the circulation of cooking medium while the second gate is in the second raised position, and returning the second gate from the second raised position to the first raised position after a fourth predetermined amount of time. The method also includes transferring food product from the fryer apparatus at an outlet end of the fryer apparatus.

According to another exemplary embodiment, a method for automatically cooking food products includes circulating cooking medium through a fryer apparatus using a pump, heating the cooking medium while the cooking medium is circulating to maintain a substantially constant temperature of the cooking medium, and delivering food product to an inlet end of the fryer apparatus. The method also includes maintaining food product in a first section of the fryer apparatus proximate to the inlet end; actuating a first gate, such that food product moves downstream of the first gate into a second section of the fryer apparatus; maintaining food product in the second section of the fryer apparatus; actuating a second gate, such that food product moves downstream of the second gate into a third section of the fryer apparatus; and transferring food product to a holding station at an outlet end of the fryer apparatus.

Other objects, features, and advantages of the present invention will be apparent to persons of ordinary skill in the art in view of the following detailed description of the invention and the accompanying drawings.

BRIEF DESCRIPTION OF THE DRAWINGS

For a more complete understanding of the present invention, needs satisfied thereby, and the objects, features, and advantages thereof, reference is now made to the following description taken in connection with the accompanying drawings.

FIG. 1B is a top view of an automatic cooking and filtering system according to the embodiment of the invention depicted in FIG. 1A.

DETAILED DESCRIPTION OF THE INVENTION

Preferred embodiments of the present invention, and their features and advantages, may be understood by referring to FIGS. 1A-3, like numerals being used for corresponding parts in the various drawings.

Figure 1A:
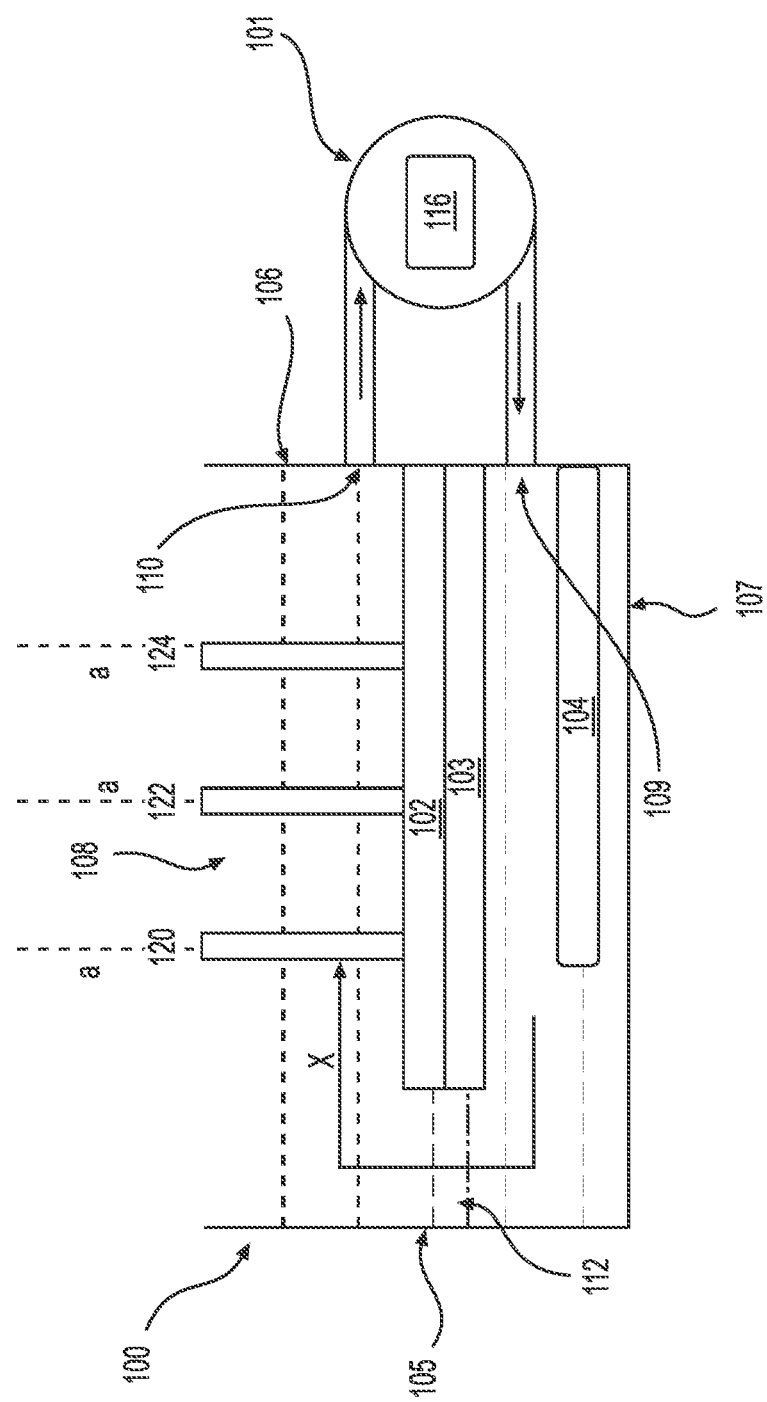
FIG. 1A is a front view of an automatic cooking and filtering system according to an embodiment of the invention.

Referring to FIG. 1A, a fryer apparatus 100 according to an embodiment of the present invention is depicted. Fryer apparatus 100 may be defined by inlet end wall 105, outlet end wall 106, sidewalls 113 (not shown), and bottom surface 107. Fryer apparatus 100 may be configured to hold cooking medium 108. Cooking medium 108 may be oil, a liquid shortening, a meltable-solid shortening, or the like. Fryer apparatus 100 may include a false bottom 102, which may rest on a ledge 103. The ledge 103 may be connected to outlet end wall 106. False bottom 102 may be lifted off of ledge 103 to facilitate easy cleaning of the fryer apparatus 100.

Cooking medium 108 may be circulated through the fryer apparatus 100 by a pump 101 in a flow direction X to create a flume that transports food product throughout the cooking process. Cooking medium 108 may enter the fryer apparatus 100 through pump outlet 109, flow in direction X through the fryer apparatus 100, and back into the pump 101 through pump inlet 110. Any suitable pump may be implemented for pump 101, including, but not limited to, a centrifugal pump, a gear pump, a vane pump, a roller pump, or a diaphragm pump. A filter manifold 116 may be disposed such that the cooking medium 108 passes through the filter manifold 116 as it flows in direction X between pump inlet 110 and pump outlet 109.

In order to facilitate the circulation of cooking medium 108, false bottom 102 and ledge 103 may be spaced from inlet end wall 105. A filter 112 may connect ledge 103 to inlet end wall 105. The filter 112 may be perforated sheet metal or any other suitable material configured to allow oil to flow from pump outlet 109 to pump inlet 110 in flow direction X. The filter 112 is configured to prevent the food products from sinking below false bottom 102 and ledge 103 and to ensure the food products flow in direction X, along the flow of cooking medium 108. Upon reaching outlet end wall 106, the food products may be transferred to a holding station (not shown). A second filter (not shown) prevents food products from entering pump inlet 110. The filter manifold 116 may include another filtering mechanism, such as a paper filter, metal mesh, or other mechanism suitable for use with heated cooking medium. Filter manifold 116 may be removable for easy cleaning of accumulated filtered particles. A heating element 104 may be disposed in fryer apparatus 100 for heating the cooking medium 108. The heating element 104 may be an electric heater or any other suitable heating mechanism.

The flow of food products from inlet end wall 105 to outlet end wall 106 may be controlled by a plurality of gates. First gate 120, second gate 122, and third gate 124 are each in a lowered position when the food products are placed in the fryer apparatus 100. In the lowered position, the first gate 120, second gate 122, and third gate 124 may each be in contact with the false bottom 102, or located relative to the false bottom 102 such that food product does not pass by the first gate 120, second gate 122, or third gate 124 in the lowered position. First gate 120 will prevent the food products from continuing to move in flow direction X until first gate 120 is raised.

After a predetermined period of time, first gate 120 may be raised and the food products may continue to flow in direction X due to the flow of the cooking medium 108. After a second predetermined period of time, first gate 120 may be lowered. At this time, the food products are located in the cooking medium 108 between first gate 120 and second gate 122.

After a third predetermined period of time, second gate 122 is raised and the food products may continue to flow in direction X due to the flow of the cooking medium 108. After a fourth predetermined period of time, second gate 122 may be lowered. The food products are then located in the cooking medium 108 between second gate 122 and third gate 124. Similarly, after a fifth predetermined period of time, third gate 124 may be raised and the food products may continue to flow in direction X due to the flow of the cooking medium 108. After a sixth predetermined period of time, third gate 124 may be lowered and the food products may be automatically transferred to a holding station (not shown) upon reaching outlet end 106. Gates 120, 122, 124 may be raised and lowered along direction a.

Actuating the gates may occur by any suitable mechanism that blocks the flow of food products in one position, and allows food products to flow downstream of the gate in a second position, for example by pivoting the gates. Actuating gates 120, 122, 124 by raising and lowering the gates is an exemplary embodiment of the present invention. Alternatively, gates 120, 122, 124 may be actuated to swing open about a pivot point. The cooking process using gates 120, 122, 124 may allow cooking of multiple batches of food product to increase the output of fryer apparatus 100.

Gates 120, 122, 124 may be raised and lowered by any suitable actuator, including but not limited to electric or pneumatic actuators. The raising and lowering of the gates may be automatically controlled by any suitable processor or controller. Data related to the predetermined time periods, defining when each gate is to be raised and lowered, may be stored on any suitable non-volatile computer readable medium. The data may be accessible by the processor or controller. This enables using fryer apparatus 100 to cook different types of food products and allows for customized settings for each particular food product. While the fryer apparatus 100 is shown with three gates in FIG. 1A, this embodiment is exemplary and not intended to be limiting as one of ordinary skill in the art would understand that any suitable number of gates could be used. Further, this embodiment shows the oil circulating clockwise, with the flow of food products from left to right. This flow direction is exemplary and the oil could circulate counterclockwise, with the flow of food products from right to left, depending on the plumbing of the unit, with the pump outlet remaining below the false bottom in any configuration.

Figure 1C:
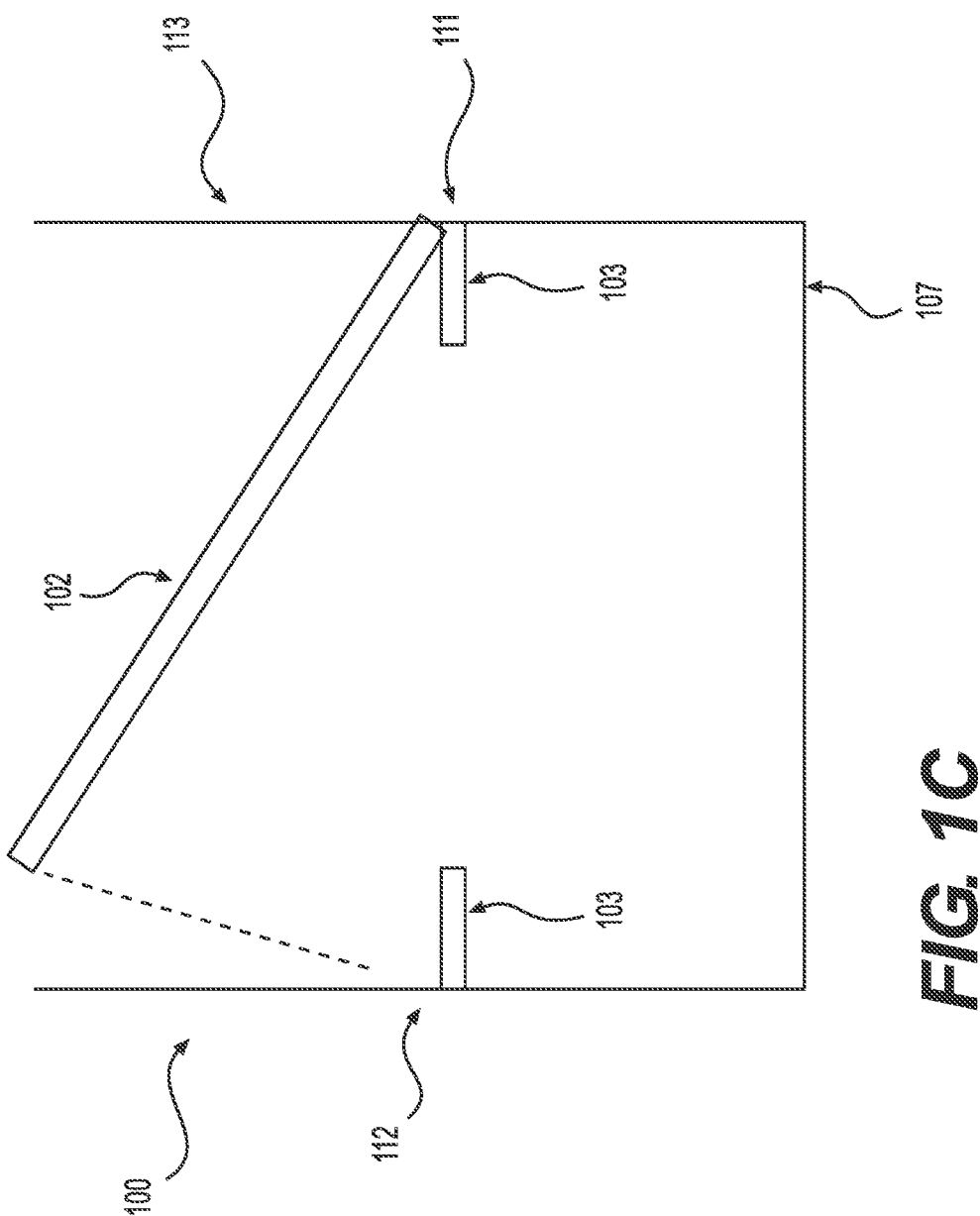
FIG. 1C is a side view of an automatic cooking and filtering system according to the embodiment of the invention depicted in FIG. 1A.

Referring to FIGS. 1B and 1C, a top view and a side view of the fryer apparatus 100 is depicted. The false bottom 102 may be connected to sidewall 113 by a hinge 111. The false bottom 102 may be hingedly lifted up from the ledge 103 to facilitate easier cleaning of the fryer apparatus 100.

Figure 1D:
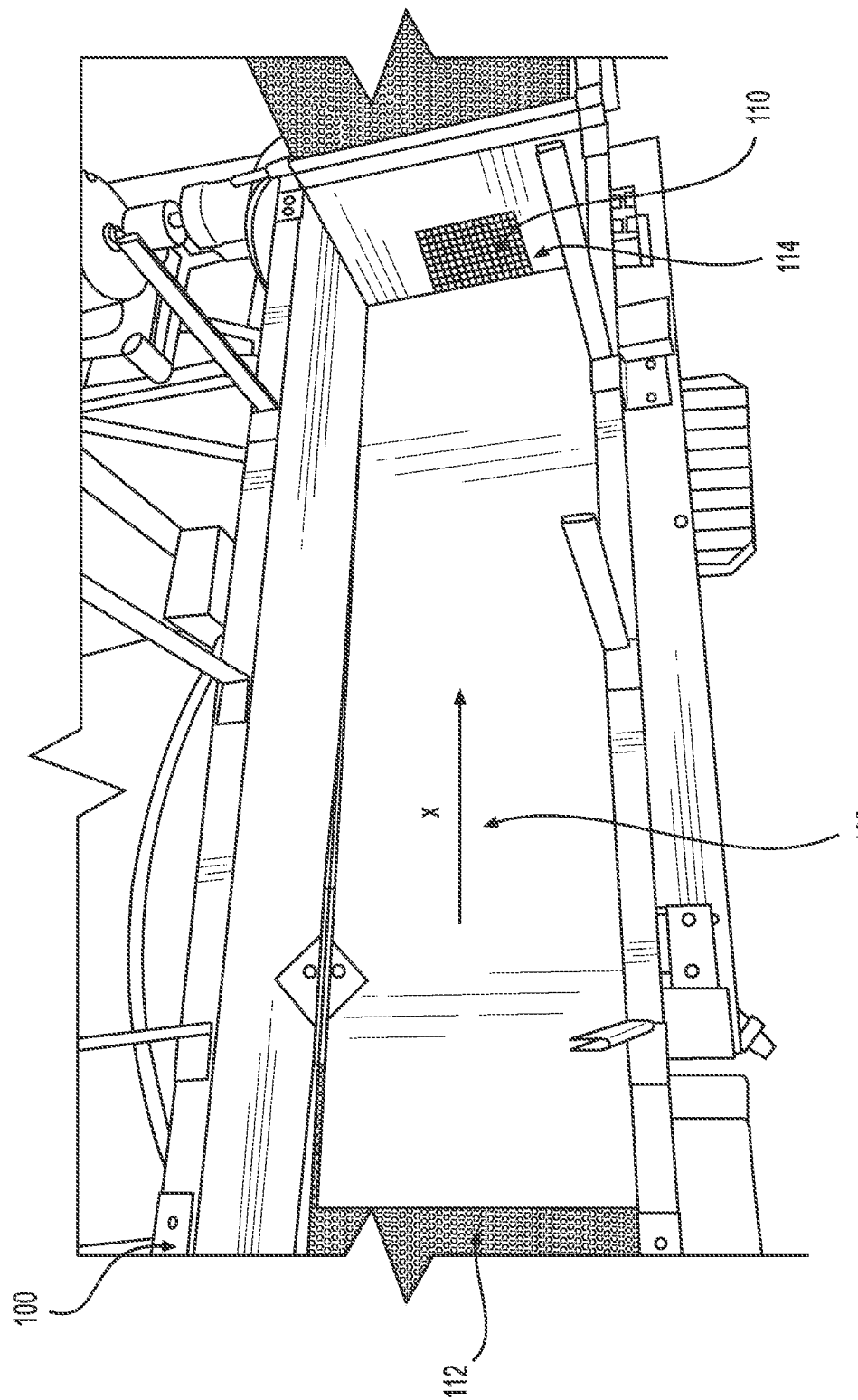
FIG. 1D is a top view of an automatic cooking and filtering system according to the embodiment of the invention depicted in FIG. 1A.

Referring to FIG. 1D, another top view of the fryer apparatus 100 is depicted. Filter 112 is located at an upstream end of the fryer apparatus 100, while false bottom 102 runs the remaining length of the fryer apparatus 100 and connects to outlet end wall 106. Second filter 114 covers pump inlet 110 to prevent food products from entering the pump inlet 110 as the food products flow downstream in the flow direction X of the cooking medium 108.

Figure 1E:
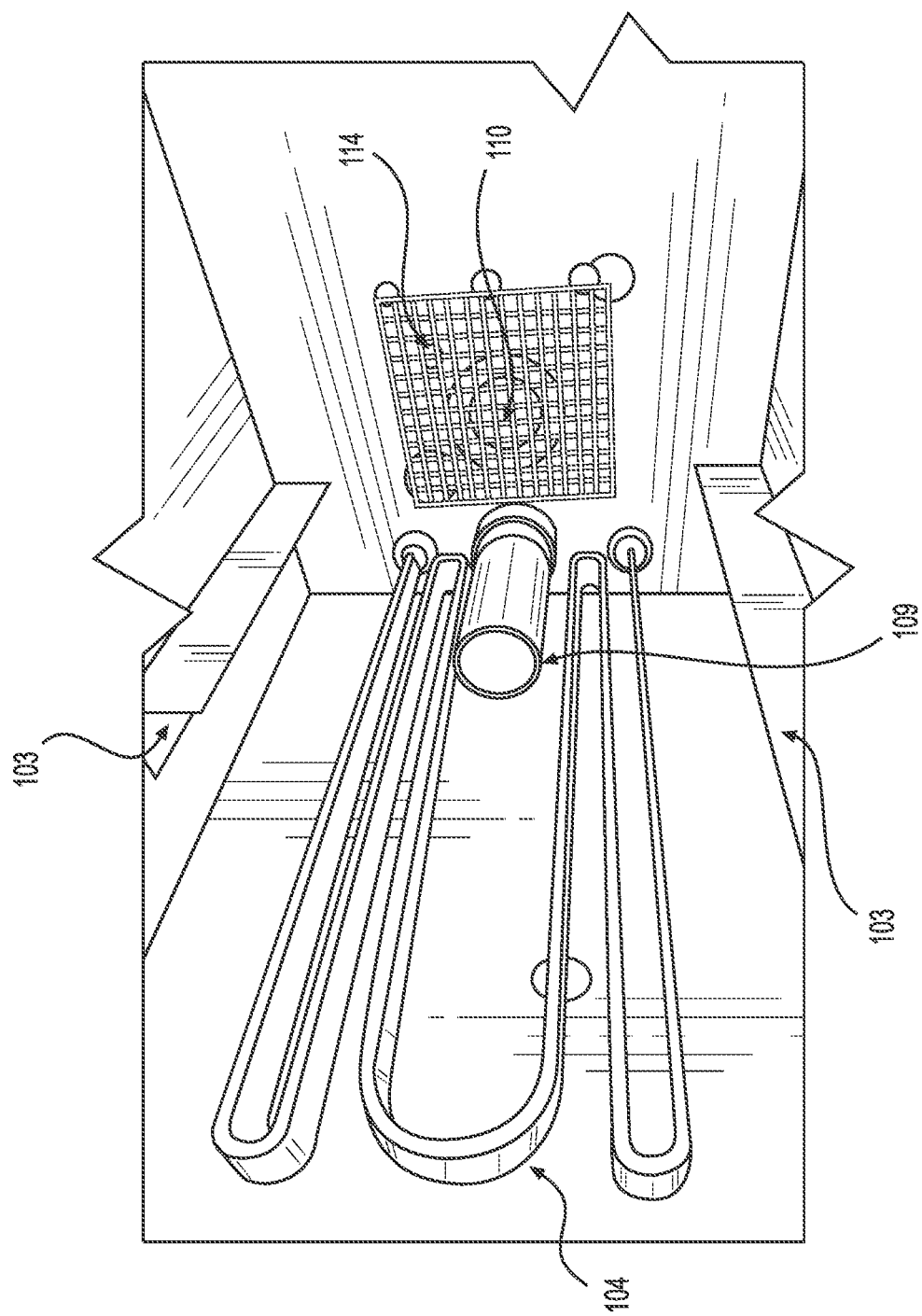
FIG. 1E is a top view of an automatic cooking and filtering system according to the embodiment of the invention depicted in FIG. 1A.

Referring to FIG. 1E, another top view of the fryer apparatus 100 is depicted. Heating mechanism 104 and pump outlet 109 are located in fryer apparatus 100. In the embodiment depicted in FIG. 1E, the heating mechanism 104 and pump outlet 109 are disposed below ledge 103. Pump inlet 110 is disposed above ledge 103 such that the false bottom 102 may serve as a divider between pump inlet 110 and pump outlet 109 when false bottom 102 rests on ledge 103. Second filter 114 covers pump inlet 110 to prevent food products from entering the pump inlet 110. Cooking medium flows out of the fryer apparatus 100 through filter 114 and pump inlet 110, flows through pump 101 and filter manifold 116 (not shown), and flows back into the fryer apparatus through pump outlet 109.

Figure 2:
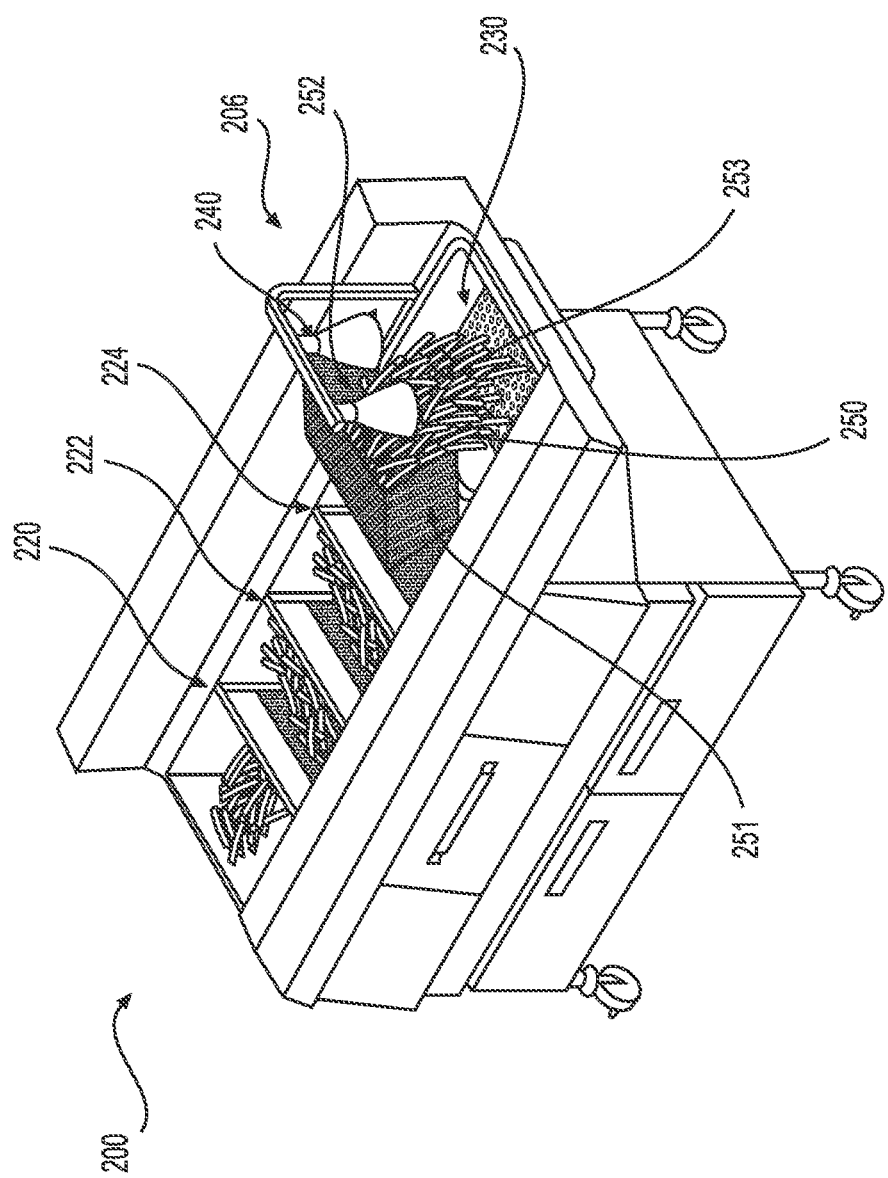
FIG. 2 is a perspective view of an embodiment of an automatic cooking and filtering system according to an embodiment of the invention.

Referring to FIG. 2, a fryer apparatus 200 according to an embodiment of the present invention is depicted. Fryer apparatus 200 may include first gate 220, second gate 222, and third gate 224 and a holding station 230 at an outlet end 206. After flowing downstream of third gate 224, food products are automatically transferred to the holding station 230. The fryer apparatus 200 may include a heat lamp 240. The food products may be transferred to the holding station 230 by any suitable means, including a basket 250. Basket 250 may be rotated to transfer the food products into the holding station 230. In one exemplary embodiment, the basket 250 is defined by a first sidewall 251, a second sidewall 252, and a downstream wall 253. This leaves the basket 250 open at the upstream end, which is adjacent to the third gate 224. The open end allows the food products to flow downstream of the third gate and into the outlet end 206 of the fryer apparatus 200. The first sidewall 251, second sidewall 252, and downstream wall 253 may be perforated to allow excess oil cooking medium to drain before the food products are transferred to the holding station 230.

Figure 3:
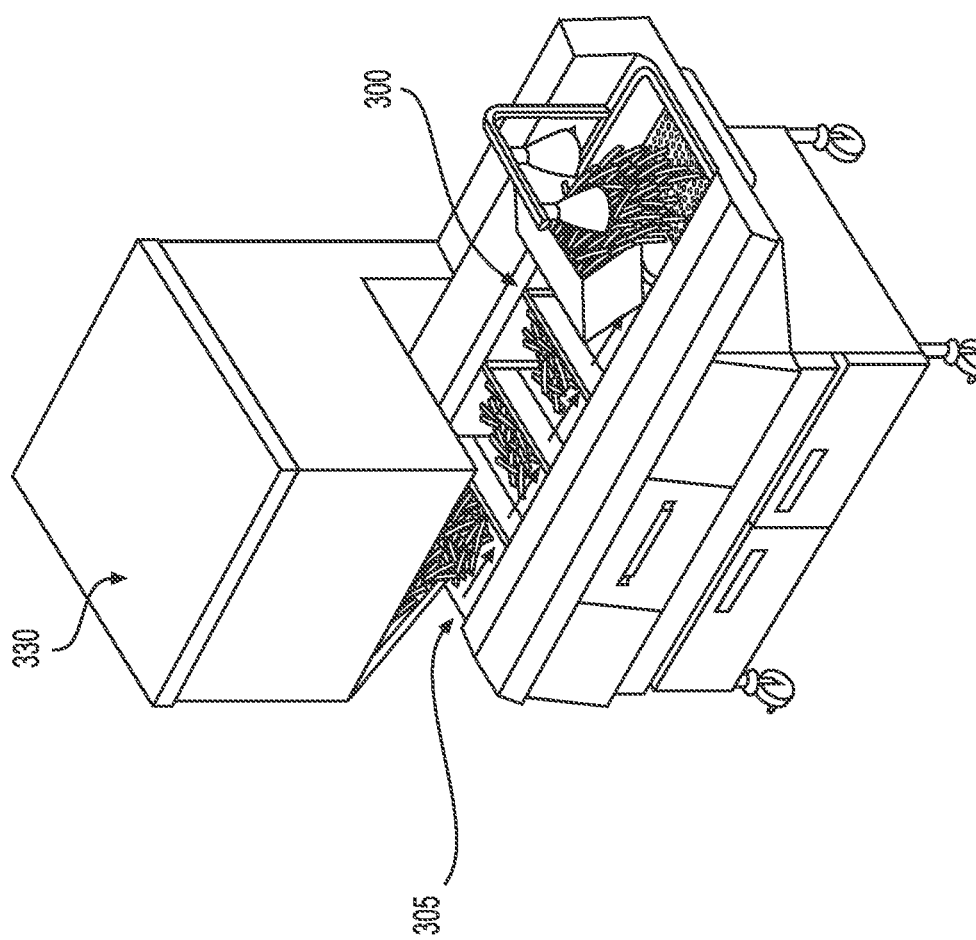
FIG. 3 is a perspective view of an embodiment of an automatic cooking and filtering system according to an embodiment of the invention.

Referring to FIG. 3, a fryer apparatus 300 according to another embodiment of the present invention is depicted. Fryer apparatus 300 is similar to fryer apparatus 100, 200 and includes a freezer or hopper 330. Freezer or hopper 330 may deliver food products to the fryer apparatus 300. Food products may be delivered in one batch, in several batches, or at a continuous rate for a set period of time. Placing freezer or hopper 330 above the fryer apparatus 300, as shown, is an exemplary embodiment of the invention, and not intended to be limiting as the freezer or hopper 330 may also be disposed to the left of inlet end 305 or any other suitable position that allows the freezer or hopper 330 to deliver food products to the fryer apparatus 300.

Figure 4A:
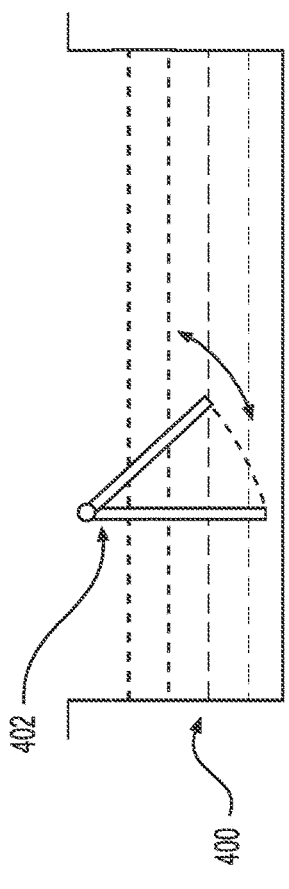
FIG. 4A is a side view of actuating a gate of an automatic cooking and filtering system.
Figure 4B:
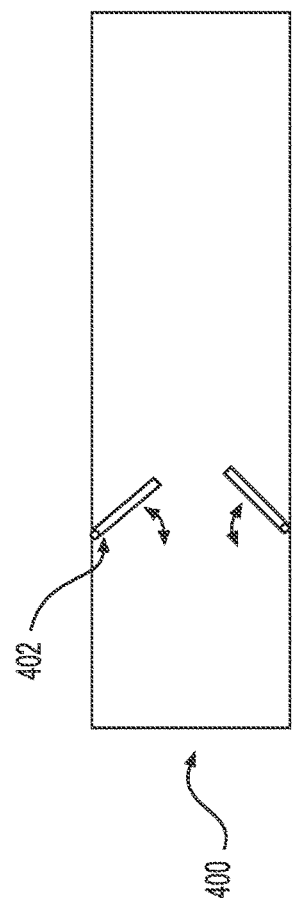
FIG. 4B is a top view of actuating a gate of an automatic cooking and filtering system.
Figure 4C:
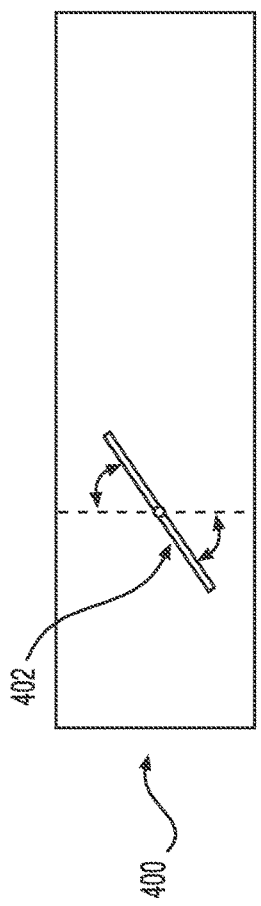
FIG. 4C is a top view of actuating a gate of an automatic cooking and filtering system.

Referring to FIGS. 4A-4C, actuating mechanisms for a gate 402 of a fryer apparatus 400 according to embodiments of the present invention are depicted. FIG. 4A depicts actuating a gate 402 about a horizontal pivot point, such that the gate may lift up in a manner similar to a typical garage door. FIG. 4B depicts actuating a gate 402 about a vertical pivot point, such that the gate may split and open from the middle. FIG. 4C depicts actuating a gate 402 about a vertical pivot point, which may be located in the center of the fryer apparatus 400. Any suitable way of actuating a gate to permit food product to travel with the flow of cooking medium is within the scope of the invention.

While the invention has been described in connection with preferred embodiments, it will be understood by those of ordinary skill in the art that other variations and modifications of the preferred embodiments described above may be made without departing from the scope of the invention.

Other embodiments will be apparent to those of ordinary skill in the art from a consideration of the specification or practice of the invention disclosed herein. The specification and described examples are considered exemplary only, with the true scope and spirit of the invention indicated by the following claims.

What is claimed is:

1. A method for automatically cooking food products comprising:
    circulating cooking medium through a fryer apparatus in a flow direction using a pump;
    heating the cooking medium while the cooking medium is circulating to maintain a substantially constant temperature of the cooking medium;
    delivering food product to an inlet end of the fryer apparatus;
    maintaining food product in a first section of the fryer apparatus proximate to the inlet end by maintaining a first gate in a first position;
    actuating the first gate to a second position and maintaining the first gate in the second position, such that food product moves downstream of the first gate into a second section of the fryer apparatus along the flow direction by action of the circulating cooking medium while the first gate is maintained in the second position;
    maintaining food product in the second section of the fryer apparatus by maintaining a second gate in a first position;
    actuating the second gate to a second position and maintaining the second gate in the second position, such that food product moves downstream of the second gate into a third section of the fryer apparatus along the flow direction by action of the circulating cooking medium while the second gate is maintained in the second position; and
    transferring food product to a holding station at an outlet end of the fryer apparatus.

2. The method of claim 1, further comprising:
    maintaining food product in the third section of the fryer apparatus by maintaining a third gate in a first position;
    actuating the third gate to a second position and maintaining the third gate in the second position, such that the food product moves downstream of the third gate into a fourth section of the fryer apparatus proximate to the holding station along the flow direction by action of the circulating cooking medium while the third gate is maintained in the second position.

3. The method of claim 1, wherein maintaining food product in the first section further comprises waiting a first predetermined amount of time before actuating the first gate; and
    wherein maintaining food product in the second section further comprises waiting a second predetermined amount of time before actuating the second gate.

4. The method of claim 3, wherein the fryer apparatus further comprises a controller configured to actuate the first gate after the first predetermined amount of time and actuate the second gate after the second predetermined amount of time are programmable by an operator.

5. The method of claim 4, wherein data corresponding the first predetermined amount of time and the second predetermined amount of time are stored in a non-volatile computer readable medium for use by the controller.

6. A method for automatically cooking food products comprising:
    circulating cooking medium through a fryer apparatus using a pump;
    heating the cooking medium while the cooking medium is circulating to maintain a substantially constant temperature of the cooking medium;
    delivering food product to an inlet end of the fryer apparatus;
    maintaining food product in a first section of the fryer apparatus proximate to the inlet end;
    actuating a first gate, such that food product moves downstream of the first gate into a second section of the fryer apparatus;
    maintaining food product in the second section of the fryer apparatus;
    actuating a second gate, such that food product moves downstream of the second gate into a third section of the fryer apparatus; and
    transferring food product to a holding station at an outlet end of the fryer apparatus,
    wherein actuating the first gate comprises:
        raising the first gate;
        maintaining the first gate in a first raised position for a first delay period in order to allow food product to flow beneath the first gate in a flow direction of the circulating cooking medium; and
        lowering the first gate after the first delay period ends.

7. The method of claim 6, wherein after lowering the first gate, the food product is located downstream relative to the first gate, and wherein the second gate is configured to prevent food product from continuing in the flow direction for at least a second predetermined amount of time.

8. The method of claim 7, wherein actuating the second gate comprises:
    raising the second gate after lowering the first gate;
    maintaining the second gate in a second raised position for a second delay period in order to allow the food product to flow beneath the second gate in the flow direction; and
    lowering the second gate after the second delay period ends.

9. The method of claim 1, wherein the fryer apparatus comprises a false bottom arranged above a bottom of the fryer apparatus and connected to a sidewall of the fryer apparatus, and wherein a flow of the cooking medium is allowed regardless of the actuation of the first and second gates, based on relative positioning of the false bottom and the first and second gates.

* * * * *

UNITED STATES PATENT AND TRADEMARK OFFICE
CERTIFICATE OF CORRECTION

PATENT NO. : 10,945,559 B2
APPLICATION NO. : 15/772830
DATED : March 16, 2021
INVENTOR(S) : Charles Leader et al.

Page 1 of 1

It is certified that error appears in the above-identified patent and that said Letters Patent is hereby corrected as shown below:

In the Specification

Column 1, Line 20, reads "2. Description of Related Art" and should read -- Description of Related Art --.

Column 5, Line 59, reads "of the fryer apparatus 100 is depicted. The false bottom 102" and should read -- of the fryer apparatus 100 are depicted. The false bottom 102 --.

In the Claims

Claim 4, Column 8, Line 2, reads "time are programmable by an operator." and should read -- time. --.

Claim 5, Column 8, Line 3, reads "The method of claim 4, wherein data corresponding the" and should read -- The method of claim 4, wherein data corresponding to the --.

Signed and Sealed this
First Day of June, 2021

Drew Hirshfeld
*Performing the Functions and Duties of the
Under Secretary of Commerce for Intellectual Property and
Director of the United States Patent and Trademark Office*